G. P. Farmer,
Spool & Needle Threader.
No. 106,925. Patented Aug. 30, 1870.
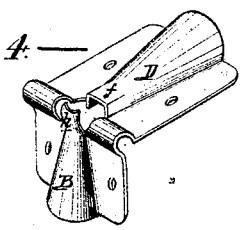
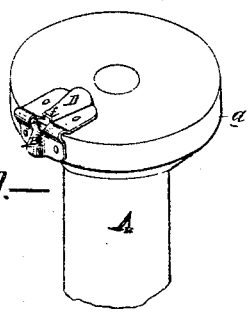
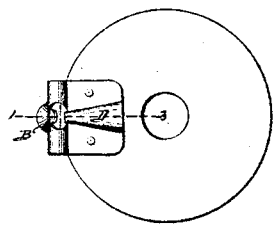
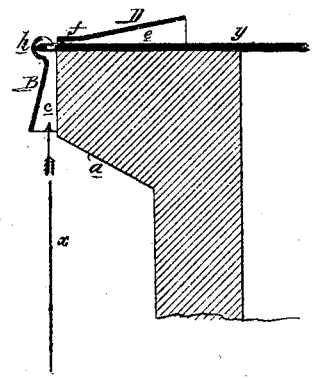
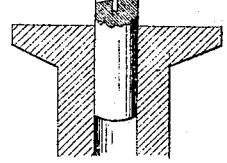
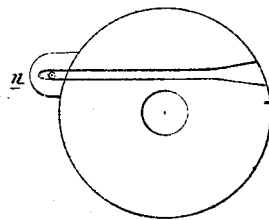
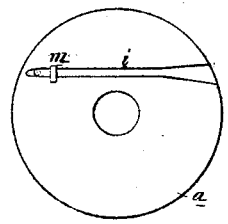
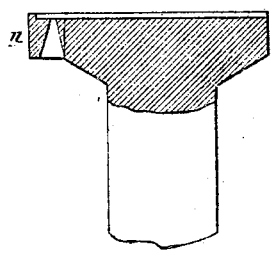
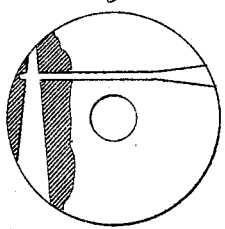
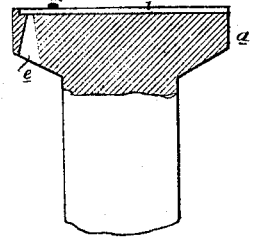
Witnesses: John Parker, Louie Boswell
G. P. Farmer, by his Atty, Houston & Son

United States Patent Office.

GEORGE PENRICE FARMER, OF PHILADELPHIA, PENNSYLVANIA.

Letters Patent No. 106,925, dated August 30, 1870.

COMBINED SPOOL AND NEEDLE-THREADER.

The Schedule referred to in these Letters Patent and making part of the same.

I, GEORGE PENRICE FARMER, of Philadelphia, county of Philadelphia, State of Pennsylvania, have invented a Combined Spool and Needle-Threader, of which the following is a specification.

Nature and Object of the Invention.

My invention consists of a spool with which is combined, substantially in the manner described hereafter, a device for guiding the thread of the spool through the eye of a needle, the said device being arranged for attachment to or forming a part of the spool.

Description of the Accompanying Drawing.

Figure 1 is a perspective view of part of a spool with a needle-threading device;

Figure 2, a view of the end of the spool with its threader;

Figure 3, a vertical section (drawn to an enlarged scale) on the line 1--2, fig. 2;

Figure 4, a perspective view of the threading device, drawn to an enlarged scale;

Figures 5 and 6, views representing a modification of my invention;

Figures 7 and 8, view representing another modification; and

Figures 9 and 10 represent further modifications.

General Description.

In figs. 1, 2, 3, and 4—

A represents a portion of a spool for containing sewing-thread, $a$ being one of the flanges of the spool.

To the edge of this flange is secured a small plate, B, so bent in the middle as to form a conical guiding orifice, $c$, for the insertion of the thread $x$ in the direction of the arrow, fig. 3.

To the top of the flange is secured another portion, D, of the plate, or it may be a separate plate, bent so as to form a guide, $e$, for the needle $y$, the guide being so formed at and near its outer end that the perforated end of the needle cannot pass through it, unless one of its flattened sides is in contact with the flange of the spool, so that the eye of the needle is in a proper position for receiving the thread passed through the guide $e$, a projection, $h$, on the plate B, forming a stop for the end of the needle, so that the eye of the latter shall be in line with the narrowest portion or throat of the guide $e$; on directing the thread $x$, therefore, through the said guide, it must pass through the eye of the needle.

The guide $c$ should be of dimensions suitable for the thread wound on the spool to which the guide is attached, and the guide $e$ should be adapted to a needle of appropriate size for the thread.

There are several other modes of combining a needle-threader with a spool; in figs. 5 and 6, for instance, the thread-guide $e$ consists of a tapering hole formed in the flange of the spool, and communicating with the groove $i$ formed in the top of the flange, and constituting the needle guide.

This groove terminates at such a point in relation to the thread-guide, that the eye of the needle, when the latter is adjusted to the end of the groove, will coincide with the thread-guide, and a staple-like projection, $m$, may be so arranged above the groove as to insure the self-adjustment of the needle in a proper position for its eye to receive the thread.

In the modifications shown in figs. 7 and 8 the thread-guide is formed in a projection, $n$, on the flange of the spool, the needle-guiding groove $i$ being continued nearly across this projection.

It is not essential in carrying out my invention that the thread-guide should be arranged in respect to the spool in the manner shown in the several plans described above; it may, for instance, be formed in the top of the spool, as shown in fig. 9, in which case the thread will be directed horizontally through the eye of the needle, the guide for which should be so arranged that the flattened sides of the needle will be vertical, or the needle-threader may consist of a horizontally arranged thread-guide, and a vertical aperture for admitting the needle.

Whatever modification of my invention be adopted, whether the threading-device be attached to or is formed in, or otherwise constitutes a part of the spool, it is always at hand as a convenient instrument ready for use in guiding the thread of the spool through the eye of a needle.

If the spool is made of wood, the device illustrated in figs. 1, 2, 3, and 4 may be adopted, and if made of metal, hard rubber, bone, porcelain, or very hard wood, any of the other modifications of my invention may be applied to the spool.

Claims.

1. A spool, with which is combined a needle-threading device, substantially in the manner described.

2. A needle-threading device, arranged for attachment to or forming a part of a spool, substantially as specified.

In testimony whereof I have signed my name to this specification in the presence of two subscribing witnesses.

GEORGE PENRICE FARMER.

Witnesses:
HENRY BROWN, Jr.,
ALFRED YOUNGMAN.